(12) United States Patent
Toyoda et al.

(10) Patent No.: US 7,700,904 B2
(45) Date of Patent: Apr. 20, 2010

(54) COMPOUND-EYE IMAGING DEVICE

(75) Inventors: Takashi Toyoda, Daito (JP); Yoshizumi Nakao, Daito (JP); Kouichi Kugo, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/175,372

(22) Filed: Jul. 17, 2008

(65) Prior Publication Data

US 2009/0021837 A1 Jan. 22, 2009

(30) Foreign Application Priority Data

Jul. 18, 2007 (JP) ............................. 2007-186658

(51) Int. Cl.
*H01L 27/00* (2006.01)
(52) U.S. Cl. .............. 250/208.1; 250/214.1; 250/214 R; 359/619
(58) Field of Classification Search .............. 250/208.1, 250/214.1, 214 R; 359/619
See application file for complete search history.

(56) References Cited

U.S. PATENT DOCUMENTS

| 5,751,492 | A | 5/1998 | Meyers |
| 7,375,312 | B2 * | 5/2008 | Butterworth ............ 250/214 R |
| 7,423,679 | B2 * | 9/2008 | Szajewski et al. ........... 348/308 |
| 2007/0090275 | A1 | 4/2007 | Toyoda et al. |

FOREIGN PATENT DOCUMENTS

| DE | 1 016 033 | 9/1957 |
| JP | 61-289321 A | 12/1986 |
| JP | 2-86276 A | 3/1990 |
| JP | 3-175403 A | 7/1991 |
| JP | 10-84104 | 3/1998 |

OTHER PUBLICATIONS

European Search Report dated Oct. 29, 2008 (Seven (7) pages).
Japanese Office Action dated Jun. 2, 2009 with English translation (five (5) pages).

* cited by examiner

*Primary Examiner*—Seung C Sohn
(74) *Attorney, Agent, or Firm*—Crowell & Moring LLP

(57) ABSTRACT

A compound-eye imaging device comprises nine optical lenses arranged in a matrix array of three rows and three columns, and a solid-state imaging element for capturing unit images formed by the optical lenses. A stray light blocking member having a rectangular-shaped window is provided on the capture zone side of the optical lenses, eliminating the need to provide, between the solid-state imaging element and the optical lenses, walls by which light propagation paths of lights emitted from the optical lenses are partitioned from each other. The stray light blocking member blocks incident lights in a range outside each effective incident view angle range of each optical lens. This prevents the light entering each optical lens to form a unit image from interfering with other unit images formed by adjacent optical lenses, thereby obtaining a good quality image, without complicating the manufacturing process and increasing the cost thereof.

5 Claims, 4 Drawing Sheets

COMPOUND-EYE IMAGING DEVICE

BACKGROUND OF THE INVENTION

1. Field of the Invention

The present invention relates to a compound-eye imaging device.

2. Description of the Related Art

A compound-eye imaging device is known as an imaging device to realize a thin camera as disclosed, for example, in Japanese Laid-open Patent Publication Hei 10-84104. The compound-eye imaging device (image sensor) according to Japanese Laid-open Patent Publication Hei 10-84104 has a lenslet array of multiple integrated optical lenses (lenslets), and a solid-state imaging element (photosensor array) for capturing multiple unit images formed by the optical lenses.

Generally, in order to reduce the size of the compound-eye imaging device, the optical lenses are densely formed, and the unit images formed by the optical lenses are also formed close to each other on the solid-state imaging element. However, a compound-eye imaging device having densely formed optical lenses to form unit images close to each other has a disadvantage that light entering through each optical lens to form each unit image corresponding to the each optical lens may interfere with light (hereafter referred to as "stray light") entering through an adjacent optical lens or lenses, thereby degrading each unit image. This may cause a combined image or a panoramic image produced from the unit images to be no good.

In order to overcome this disadvantage, it is known to provide, between the solid-state imaging element and the optical lenses, walls (spacers in the compound-eye imaging device of Japanese Laid-open Patent Publication Hei 10-84104) by which light propagation paths of lights emitted from the optical lenses are partitioned from each other. However, such compound-eye imaging device has other problems. For example, the space between the solid-state imaging element and the optical lenses is narrow. Thus, there is a problem that a complicated and time-consuming work is unavoidably required to accurately incorporate the walls into the narrow space, causing the manufacturing process of the compound-eye imaging device to be complicated.

In addition, although components of light, which are emitted from each optical lens, and which have large emission angles and thus are likely to become stray light, are prevented by the provision of the walls from propagating any further to reach an adjacent unit image or images, the components of light reflected from the walls may reach the solid-state imaging element which is located in an area partitioned by the walls and which forms a unit image corresponding to the each optical lens, thereby interfering with and degrading such unit image itself. Thus, in order to prevent the generation of stray light and the degradation of each unit image, the wall surface of the walls is required to have an extremely low reflectance e.g. by selecting the material of the walls. However, this further complicates the manufacturing process and increases the cost of the compound-eye imaging device.

SUMMARY OF THE INVENTION

An object of the present invention is to provide a compound-eye imaging device which can prevent the generation of stray light without complicating the manufacturing process and increasing the cost thereof, and can obtain a good quality image without interference by the stray light.

This object is achieved according to the present invention by a compound-eye imaging device comprising: multiple optical lenses for collecting light in a capture zone; a solid-state imaging element for capturing, on a surface thereof, unit images formed by the multiple optical lenses, respectively; and a stray light blocking member provided on a capture zone side of the optical lenses for limiting an incident angle of light entering each optical lens for each unit image so as to prevent the light entering the each optical lens and emitted to the solid-state imaging element from interfering with other unit images than the each unit image.

The thus structured compound-eye imaging device of the present invention has the stray light blocking member provided on the capture zone side of the optical lenses, thereby eliminating the need to provide walls between the solid-state imaging element and the optical lenses, so that it can prevent the generation of stray light without complicating the manufacturing process and increasing the cost thereof, and can easily obtain a good quality image without interference by the stray light.

The compound-eye imaging device can further comprise a prism placed on the capture zone side of the optical lenses for changing propagation paths of lights to be collected on the optical lenses, wherein the stray light blocking member is placed on the capture zone side relative to the prism. Since the stray light blocking member is placed on the capture zone side relative to the prism, it can be mounted in the compound-eye imaging device without complicating the manufacturing process and increasing the cost thereof The stray light blocking member can be a film attached to a surface of the prism or a layer printed on the prism. This makes it possible to further reduce the size of the entire compound-eye imaging device.

The compound-eye imaging device can further be designed so that the optical lenses are arranged as an integrated group in a matrix array of rows and columns, wherein the stray light blocking member surrounds the integrated group of optical lenses as seen in plan view, and has a rectangular window of a rectangle similar to an outer shape of the integrated group of optical lenses.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
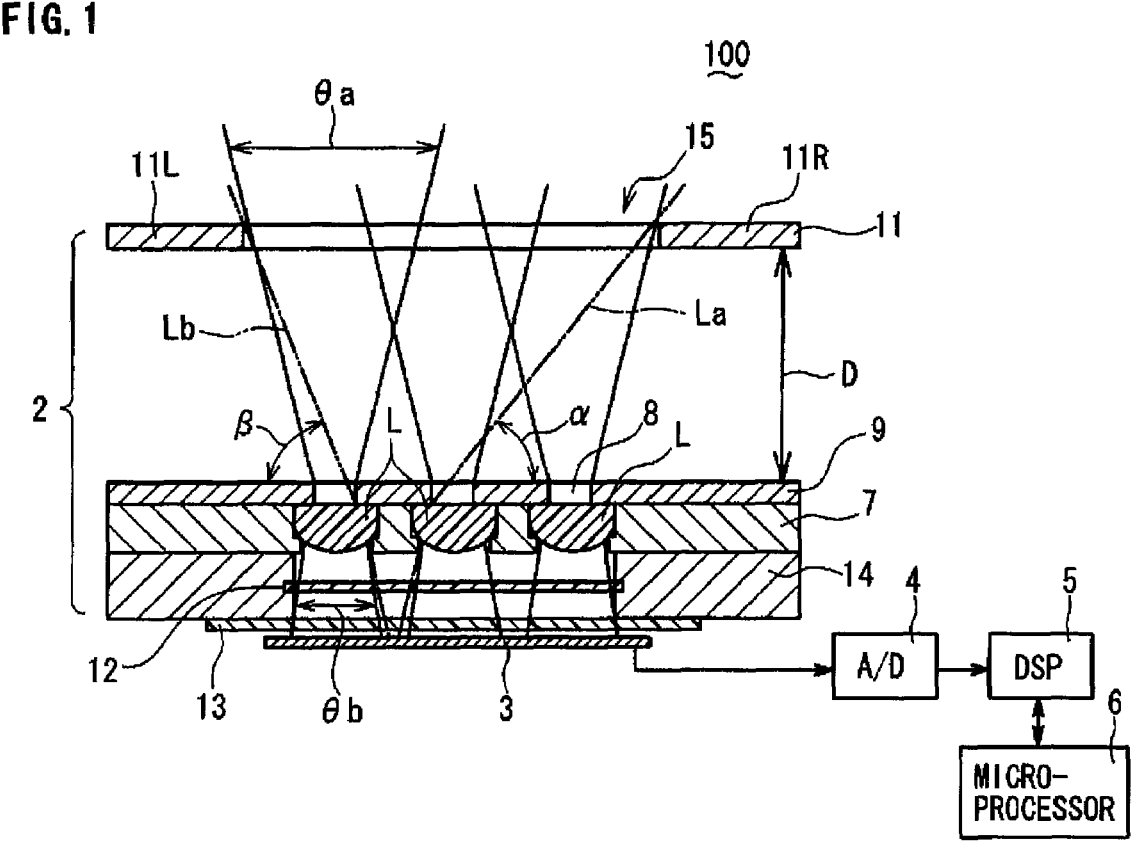
FIG. 1 is a schematic cross-sectional view of a compound-eye imaging device according to a first embodiment of the present invention.

Embodiments of the present invention, as best mode for carrying out the invention, will be described hereinafter with reference to the drawings. The present invention relates to a compound-eye imaging device. It is to be understood that the embodiments described herein are not intended as limiting, or encompassing the entire scope of, the present invention. Note that like parts are designated by like reference numerals, characters or symbols throughout the drawings.

First Embodiment

Figure 2:
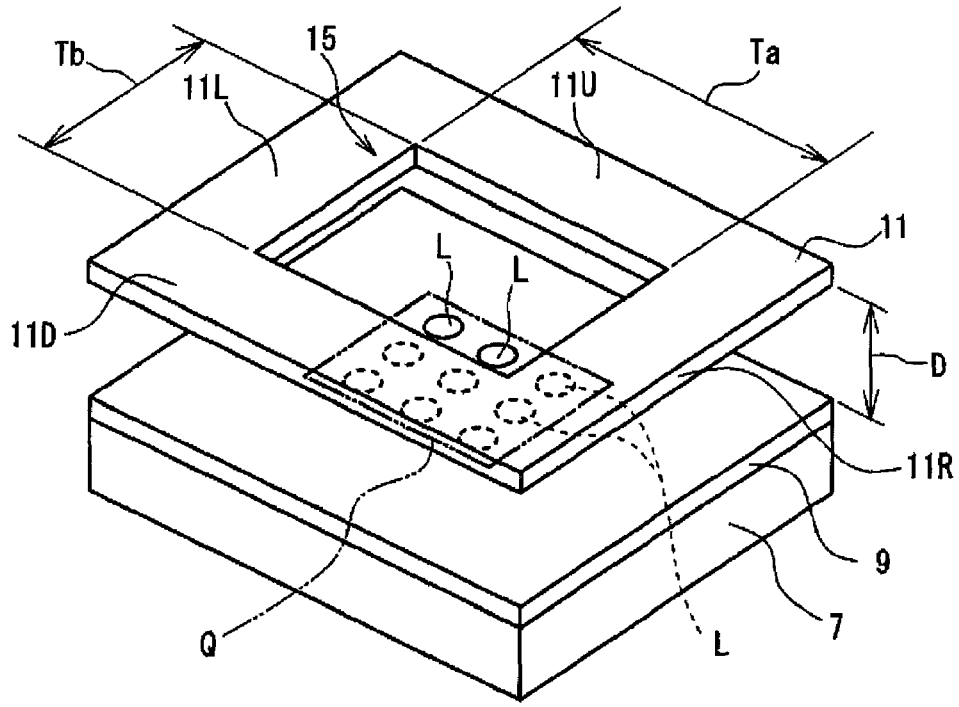
FIG. 2 is a schematic perspective view of the compound-eye imaging device.
Figure 3:
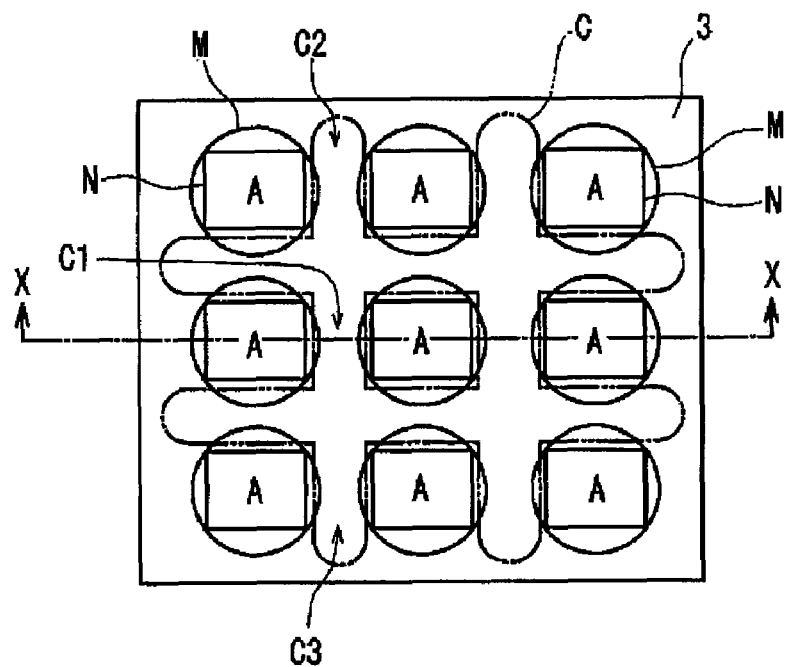
FIG. 3 is a schematic plan view of a solid-state imaging element in the compound-eye imaging device, showing unit images formed on the solid-state imaging element.

Referring to FIG. 1 to FIG. 3, a compound-eye imaging device 100 according to a first embodiment of the present invention will be described. FIG. 1 is a schematic cross-sectional view (along line X-X shown in FIG. 3) and FIG. 2 is a schematic perspective view of the compound-eye imaging device 100. As shown in FIG. 1, the compound-eye imaging device 100 comprises in a housing (not shown) thereof: an optical system 2 including optical lenses M, described later, for collecting light in a capture zone to form multiple unit images on a predetermined focal plane; and a solid-state imaging element 3 placed at the focal plane of the optical lens system 2 for converting the multiple unit images formed by the optical lens system 2 to electronic image information. The compound-eye imaging device 100 further comprises: an A/D (Analog-to-Digital) converter 4 for converting the electronic image information to digital information; a DSP (Digital Signal Processor) 5 for receiving the digital information (unit images) from the A/D converter 4; and a microprocessor 6 for subjecting the image information (unit images) received by the DSP 5 to image processes, such as an image extracting process and an image combining process, so as to produce one combined image.

The optical lens system 2 is held in one plane by a lens holder 7, and comprises nine optical lenses L (refer to FIG. 2) arranged in a matrix array of three rows and three columns, and a plate-shaped stop member 9 having nine stop apertures 8 at positions corresponding to the optical lenses L, respectively. The optical lens system 2 further comprises: a stray light blocking member 11 provided at a position distant from the plate-shaped stop member 9 by a predetermined distance D for limiting the incident angle of light entering each stop aperture 8 in the capture zone; a filter 12 for cutting off a near infrared range of light emitted from each optical lens L toward the solid-state imaging element 3; and a cover glass 13 for covering the solid-state imaging element 3. The filter 12 is held by a holder member 14 in a hollow portion of the holder member 14 which is fixed to a lower surface of the lens holder 7, while the cover glass 13 is supported by a lower surface of the holder member 14. It is to be noted that the stray light blocking member 11 is provided on the capture zone side, i.e. in a space which is relatively more open or wider than the narrow space between the solid-stating imaging element 3 and the optical lenses L, preventing complication of the manufacturing process.

FIG. 3 is a schematic plan view of the solid-state imaging element 3 in the compound-eye imaging device 100, showing unit images M formed on the solid-state imaging element 3. The solid-state imaging element 3 is formed of a CCD (Charge Coupled Device) image sensor or a CMOS (Complementary Metal Oxide Semiconductor) image sensor. As shown in FIG. 3, the solid-state imaging element 3 captures or forms, on a surface thereof, nine unit images M corresponding to and formed by the nine optical lenses L, respectively. FIG. 3 shows a case where a letter "A" (as a target object to be captured) is captured as unit images M. Although each of the unit images M formed on the solid-state imaging element 3 by the respective optical lenses L has a shape of a circle, each image extracted from the circular unit image M by the microprocessor 6 e.g. to produce a combined image from the respective image units M has a shape of a rectangle (which can be a square) which is inscribed in the circle. When the microprocessor 6 extracts a rectangular image from each unit image M, the microprocessor 6 removes portions of the each unit image M which are close to adjacent unit images M. FIG. 3 shows each of such images N having a shape of rectangle (rectangular images N) as extracted by the microprocessor 6.

As shown in FIG. 2, the nine optical lenses L are arranged and integrated as an integrated group Q arranged in a rectangular pattern (which can be a square pattern). The stray light blocking member 11 surrounds the integrated group Q of optical lenses L as seen in plan view, and has a rectangular window 15 of a rectangle similar to an outer shape (rectangular shape) of the integrated group Q of optical lenses L. Here, both sides of the rectangle of the rectangular window 15 are designated by Ta, Th, and the distance of the stray light blocking member 11 from the plate-shaped stop member 9 is designated by D as shown in FIG. 2. These parameters Ta, Th and D are set (selected) so that the respective lights passing through the stray light blocking member 11 and the stop apertures 8 and collected by the respective optical lenses L and further emitted from the respective optical lenses L to the solid-state imaging element 3 are prevented from entering unit images M other than the unit images M corresponding to the respective optical lenses L.

Referring back to FIG. 1, these parameters Ta, Tb and D will be described in more detail. Each optical lens L in the present embodiment has a view angle of about 30° (thirty degrees). FIG. 1 shows an angular range θa (hereafter referred to as "effective incident view angle range") of light collected by each optical lens L within a view angle (capture angle) of the optical lens L as well as an angular range θb (hereafter referred to as "effective exit view angle range") of light emitted from the each optical lens L toward the solid-state imaging element 3 (after collected by the each optical lens L in the effective incident view angle range θa) to form each unit image M. The optical lens system 2 is designed so that the unit images M formed by lights each emitted from each optical lens L in the effective exit view angle range θb do not overlap each other (refer to FIG. 3).

Furthermore, the parameters described above, which are distance D of the stray light blocking member 11 from the plate-shaped stop member 9 and the lengths Ta, Th of the sides of the rectangular window 15 of the stray light blocking member 11, are set so that the stray light blocking member 11 does not block light in the effective incident view angle range θa to pass through each of the optical lenses L. In addition, these parameters Ta, Th and D are designed so that light coming from outside the effective incident view angle range θa and entering each optical lens L corresponding to each unit image M is prevented from entering a unit image M or images M adjacent to the each unit image M corresponding to the each optical lens L. This prevents lights passing through optical lenses corresponding to adjacent unit images from interfering with each other.

This can be explained with reference to FIG. 3 showing an area C in a rough grid pattern which is an area formed between the nine unit images M corresponding to the nine optical lenses L arranged in a matrix array of three rows and three columns in the compound-eye imaging device 100. Due to the design of the parameters Ta, Th (lengths) and D (distance) described above, the grid-patterned area C is an only possible area in which lights passing through adjacent optical lenses L diagonally from the front (i.e. from a target object to be captured), as shown e.g. by boundary lights La, Lb described below, may interfere with each other. A partial area C1 of the area C is used as a representative of the area C to consider and explain the area C.

Referring to FIG. 3, the partial area C1 to be considered here is positioned between the left and middle (center) unit images M in the middle row among the nine unit images M in the matrix of three rows and three columns. FIG. 1 is a cross-sectional view of the compound-eye imaging device 100 along line X-X shown in FIG. 3 which passes through the center of each of the unit images M (or optical lenses L or stop apertures 8 corresponding thereto) in the middle row of the matrix. FIG. 1 shows a boundary light La which enters and passes through a right end of the rectangular window 15 and through a left end of the middle stop aperture 8 at an interface between the lens holder 7 (or the middle optical lens L) and the plate-shaped stop member 9 (or the middle stop aperture 8) at an incident angle of α. FIG. 1 also shows a boundary light Lb which enters and passes through a left end of the rectangular window 15 and through a right end of the left stop aperture 8 at an interface between the lens holder 7 (or the left optical lens L) and the plate-shaped stop member 9 (or the left stop aperture 8) at an incident angle of β.

Now, referring to FIG. 1 and FIG. 3, the middle (center) optical lens L might pass and emit light toward the left unit image M in the partial area C1 if such light had a lower incident angle than the boundary light La, that is an angle lower than α. However, as shown in FIG. 1, such light (or stray light), which might enter the middle (center) optical lens L at an incident angle lower than α, is actually blocked by a right part 11R of the stray light blocking member 11, so that such light does not reach the left unit image M. Thus, the left unit image M is not interfered by such light (stray light). Similarly, the left optical lens L might pass and emit light toward the middle (center) unit image M in the partial area C1 if such light had a lower incident angle than the boundary light Lb, that is an angle lower than β. However, as shown in FIG. 1, such light (or stray light), which might enter the left optical lens L at an incident angle lower than β, is actually blocked by a left part 11L of the stray light blocking member 11, so that such light does not reach the middle (center) unit image M. Thus, the middle unit image M is not interfered by such light (stray light).

This similarly applies to the other partial areas of the area C. For example, in partial areas C2 and C3 shown in FIG. 3, light (stray light) which might interfere with the left unit images M is blocked by the right part 11R of the stray light blocking member 11, while light (stray light) which might interfere with the middle unit images M is blocked by the left part 11L of the stray light blocking member 11. In other words, the interference between the left column of three unit images M and the middle column of three unit images M is prevented by the right part 11 R and the left part 11L of the stray light blocking member 11. Likewise, the interference between the right column of three unit images M and the middle column of three unit images M is prevented by the right part 11R and the left part 11L of the stray light blocking member 11. Quite similarly, the interference between the upper row of three unit images M and the middle row of three unit images M is prevented by an upper part 11U and a lower part 11D of the stray light blocking member 11. On the other hand, the interference between the lower rows of three unit images M and the middle rows of three unit images M is prevented by the upper part 11U and the lower part 11D of the stray light blocking member 11.

In short, according to the compound-eye imaging device 100 of the present embodiment having optical lenses L integrated as an integrated group Q arranged in a rectangular pattern in a matrix of three rows and three columns, the stray light blocking member 11 having the rectangular window 15 similar to the integrated group Q of optical lenses L properly limits the incident angle of light entering each optical lens L for each unit image M so as to prevent the light entering the each optical lens L and emitted to the solid-state imaging element 3 from interfering with other unit images M (adjacent unit images M) than the each unit image M, thereby preventing degradation of each unit image M (particularly in peripheral portions of the each unit image M which are close to the adjacent unit images M).

In addition, according to the compound-eye imaging device 100 of the present embodiment, when the microprocessor 6 produces a combined image from the respective unit images M, the microprocessor 6 extracts, from each circular unit image M, a rectangular image N to be used for the combined image. Since portions of each unit image M which are close and adjacent to other unit images M than the each unit image M and are likely to cause interference with such other unit images M are removed to produce each rectangular image N, the extraction of each rectangular image N for the production of a combined image also contributes to the prevention of degradation of the combined image.

As described in the foregoing, according to the compound-eye imaging device 100 of the present embodiment, the stray light blocking member 11 having the rectangular window 15 similar to the integrated group Q of optical lenses L is provided on the capture zone side of the optical lenses L arranged in a rectangular pattern in a matrix of three rows and three columns. Thus, the generation of stray light in each unit image M to interfere with adjacent unit images M can be properly prevented. In addition, since the stray light blocking member 11 is provided on the capture zone side, i.e. in a space which is relatively more open or wider than the narrow space between the solid-stating imaging element 3 and the optical lenses L, the manufacturing process can be prevented from being complicated. Note that the housing of the compound-eye imaging device 100 can be designed to also serve as such stray light blocking member 11.

Second Embodiment

Figure 4:
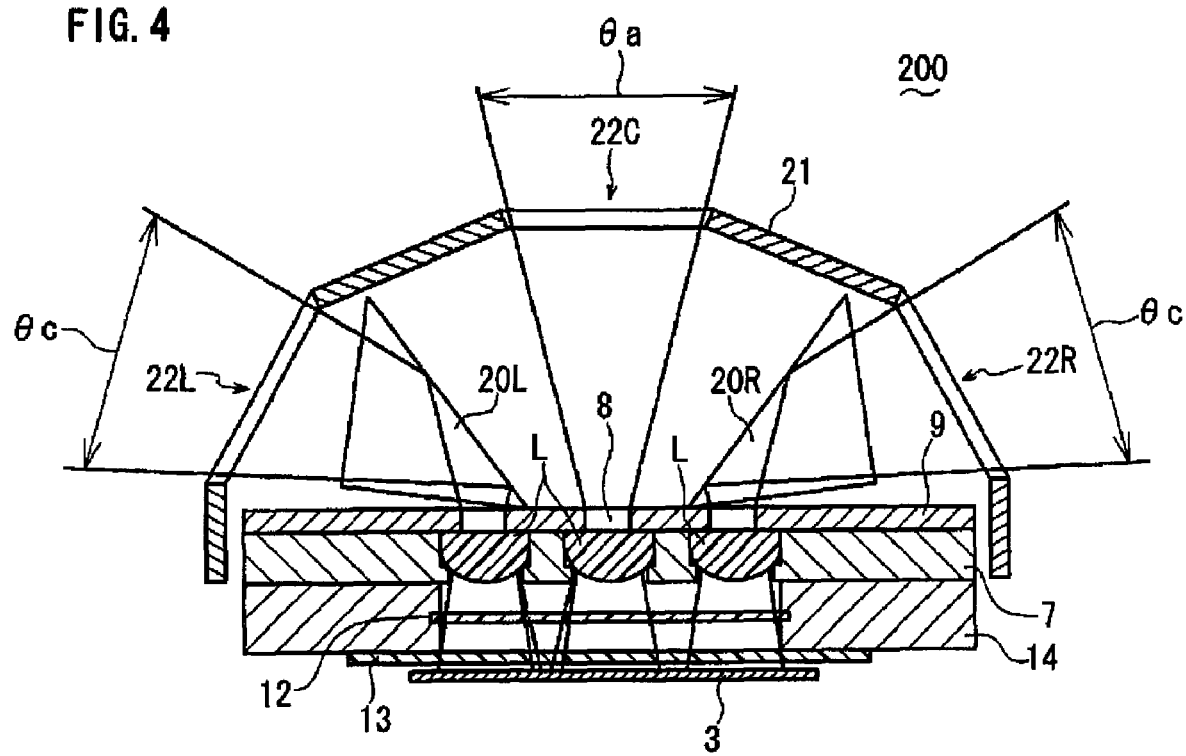
FIG. 4 is a schematic cross-sectional view of a compound-eye imaging device according to a second embodiment of the present invention.
Figure 5:
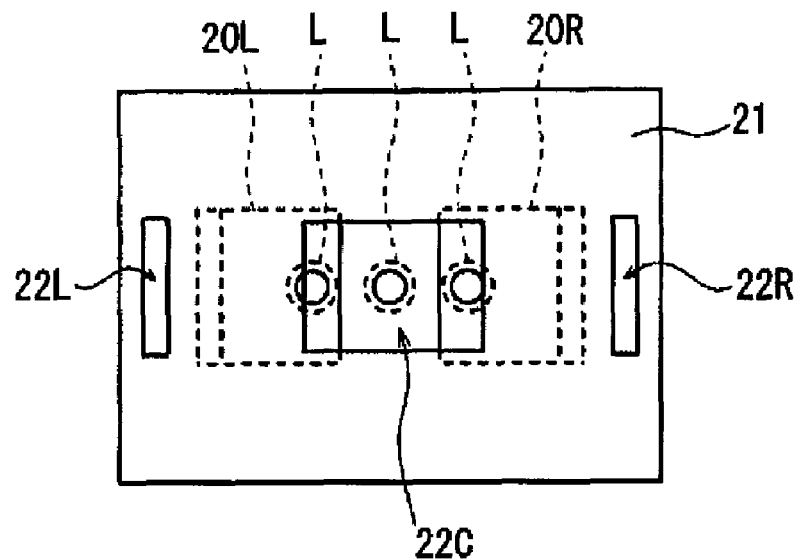
FIG. 5 is a schematic plan view of the compound-eye imaging device.

Referring to FIG. 4 and FIG. 5, a compound-eye imaging device 200 according to a second embodiment of the present invention will be described below. FIG. 4 is a schematic cross-sectional view and FIG. 5 is a schematic plan view of the compound-eye imaging device 200. The compound-eye imaging device 200 of the second embodiment has substantially the same structure as that of the compound-eye imaging device 100 of the first embodiment except for the following. First, in the compound-eye imaging device 200, the number of optical lenses L of an optical system 2 is three, in which the three optical lenses L are arranged in one row, left, center and right (refer to FIG. 5).

Second, 45-45-90 degree right-angle prisms 20L, 20R to change the propagation paths of lights to be collected on the respective optical lenses L are provided on the capture zone side of the left and right optical lenses L, respectively. Third, a stray light blocking member 21 has three windows 22L, 22C, 22R, rather than one window, which respectively correspond to lights entering the three optical lenses L. The stray light blocking member 21 is placed on the capture zone side of the optical lenses L relative to the 45-45-90 degree right-angle prisms 20L, 20R. The elements and parts of the compound-eye imaging device 200 having the structure the same as or similar to those of the compound-eye imaging device 100 are designated by the same or similar reference numerals and characters, omitting description thereof.

The 45-45-90 right-angle prisms 20L, 20R serve to bend the propagation paths of lights to be collected on the left and right optical lenses L by roughly 80° (eighty degrees) so that lights each in a capture zone at an angle of roughly 10° (ten degrees) from the plane of a plate-shaped stop member 9 (or solid-state imaging element 3) are collected on the left and right optical lenses, respectively. FIG. 4 shows an effective incident view angle range θc of light collected by each of the left and right optical lenses having a view angle of about 30° (thirty degrees), and an effective incident view angle range θa of light collected by the center optical lens also having a view angle of about 30°, in which the central axis of the effective incident view angle range θc (front range) is roughly 10° from the plane of a plate-shaped stop member 9 as described above.

As shown in FIG. 4, the stray light blocking member 21 is a dome-shaped member also serving as a housing of the compound-eye imaging device 200, and has three windows 22L, 22C, 22R formed not to block the lights in the effective incident view angle ranges θc, θa, θc for the three optical lenses L, respectively. In other words, incident lights in a range outside each of the effective incident view angle ranges θc (left range), θa (front range), θc (right range) are blocked by the dome-shaped stray light blocking member 21, and thus are prevented from being collected on the optical lenses L. Thus, similarly as in the compound-eye imaging device 100 of the first embodiment, the compound-eye imaging device 200 of the present embodiment can prevent the generation of stray light in each unit image M to interfere with adjacent unit images M, thereby preventing degradation of each unit image M without complicating the manufacturing process and increasing the cost thereof. Note that since the compound-eye imaging device 200 can capture images in the front range, left range and right range, each of about 30°, in the capture zone of 180°, it can be conveniently mounted on the rear of a vehicle to monitor the surroundings of the vehicle.

Third Embodiment

Figure 6:
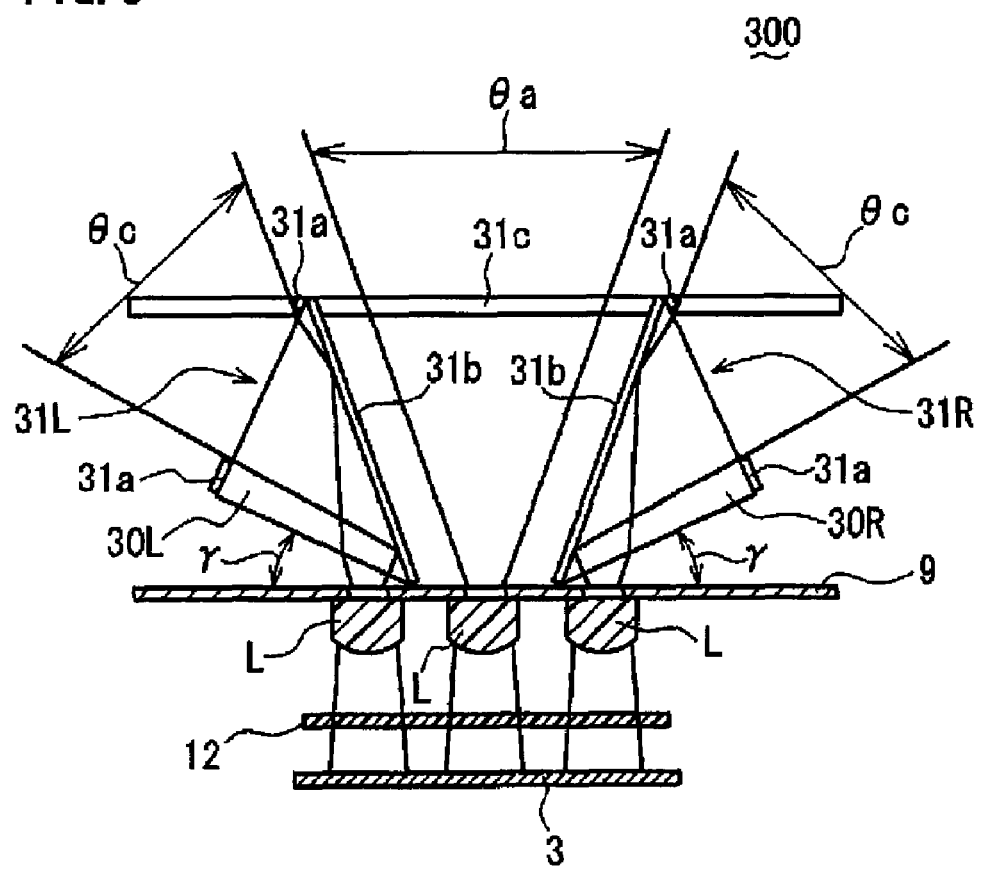
FIG. 6 is a schematic cross-sectional view of a compound-eye imaging device according to a third embodiment of the present invention.
Figure 7:
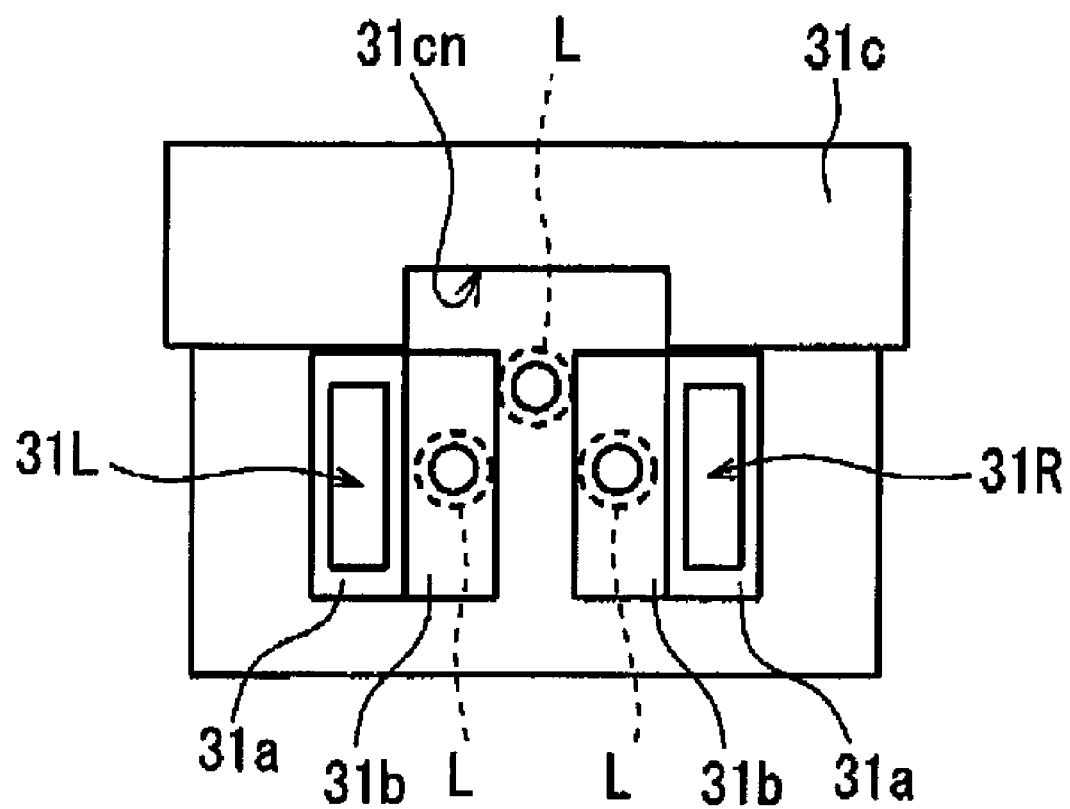
FIG. 7 is a schematic plan view of the compound-eye imaging device.

Referring now to FIG. 6 and FIG. 7, a compound-eye imaging device 300 according to a third embodiment of the present invention will be described hereinafter. FIG. 6 is a schematic cross-sectional view and FIG. 7 is a schematic plan view of the compound-eye imaging device 300. The compound-eye imaging device 300 of the third embodiment has substantially the same structure as that of the compound-eye imaging device 200 of the second embodiment except for the following. First, in the compound-eye imaging device 300, three optical lenses L are not arranged in a row, but are arranged at the vertexes of a triangle as seen in plan view (refer to FIG. 7).

Second, each of the optical lenses L is set to have a view angle of about 40° (forty degrees), while left and right 45-45-90 degree right angle prisms 30L, 30R are set to have a mounting angle γ of about 25° (twenty-five) to the optical lenses L, respectively, so as to allow effective incident view angle ranges θc, θa, θc to continuously cover the range of about 120° in the front capture range of 180°, so that a panoramic image with a picture angle of 120° can be obtained by combining unit images M formed by the respective optical lenses L. Third, a stray light blocking member 31 is formed of light blocking (shielding) films such as black films 31a, 31b attached to the left and right 45-45-90 degree right angle prisms 30L, 30R, respectively, and of a plate-shaped member 31c. The elements and parts of the compound-eye imaging device 300 having the structure the same as or similar to those of the compound-eye imaging device 200 are designated by the same or similar reference numerals and characters, omitting description thereof.

The light blocking films 31a have rectangular windows 31L, 31R, and are each attached to one of the mutually perpendicular surfaces of the left and right 45-45-90 degree right angle prisms 30L, 30R, respectively, so as to block incident lights in a range outside each of the effective incident view angle ranges θc (left range) and θc (right range). The light blocking films 31b are attached to the mutually facing hypotenuses of the left and right 45-45-90 degree right angle prisms 30L, 30R, respectively. The windows 31L, 31R of the light blocking films 31a correspond to the windows 22L, 22R formed in the stray light blocking member 21 of the compound-eye imaging device 200 in the second embodiment of the present invention.

The plate-shaped member 31c has a concave notch 31cn as seen in plan view (refer to FIG. 7), and is placed horizontally as viewed toward a target object to be imaged so that the concave notch 31cn covers around the optical lens L in the middle, covering an upper part of the optical lenses L as viewed toward the target object (namely as viewed in FIG. 7). Thus, the plate-shaped member 31c blocks, in particular, light (stray light) coming from above as viewed in FIG. 7 among incident lights in a range outside the effective incident view angle range θa of the optical lens L in the middle. Thus, similarly as in the compound-eye imaging devices 100 and 200 of the first and second embodiments, the compound-eye imaging device 300 of the present embodiment can prevent the generation of stray light in each unit image M to interfere with adjacent unit images M, thereby preventing degradation of each unit image M without complicating the manufacturing process and increasing the cost thereof. In addition, the compound-eye imaging device 300 of the present embodiment makes it possible to obtain a panoramic image with a picture angle of 120° in the front range of the compound-eye imaging device 300.

It is to be noted that the present invention is not limited to the above embodiments, and various modifications are possible within the spirit and scope of the present invention. For example, the light blocking films (black films) 31a, 31b attached to the ones of the mutually perpendicular surfaces and the hypotenuses of the left and right 45-45-90 degree right angle prisms 30L, 30R can be replaced by light blocking layers (black layers) printed on such surfaces and hypotenuses. In this case, such light blocking layers printed on the left and right 45-45-90 degree right angle prisms 30L, 30R correspond to the claimed "stray light blocking member".

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2007-186658 filed Jul. 18, 2007, the content of which is hereby incorporated by reference.

What is claimed is:

1. A compound-eye imaging device comprising:
multiple optical lenses for collecting light in a capture zone;
a lens holder for holding the multiple optical lenses in one plane;

a solid-state imaging element for capturing, on a surface thereof, unit images formed by the multiple optical lenses, respectively; and a stray light blocking member provided on a capture zone side of the optical lenses for limiting an incident angle of light entering each optical lens for each unit image so as to prevent the light entering the each optical lens and emitted to the solid-state imaging element from interfering with other unit images than the each unit image wherein the respective optical axes of the multiple optical lenses are parallel to each other.

2. The compound-eye imaging device according to claim 1, which further comprises a prism placed on the capture zone side of the optical lenses for changing propagation paths of lights to be collected on the optical lenses, wherein the stray light blocking member is placed on the capture zone side relative to the prism.

3. The compound-eye imaging device according to claim 2, wherein the stray light blocking member is a film attached to a surface of the prism.

4. The compound-eye imaging device according to claim 2, wherein the stray light blocking member is a layer printed on the prism.

5. The compound-eye imaging device according claim 1, wherein the optical lenses are arranged as an integrated group in a matrix array of rows and columns, and wherein the stray light blocking member surrounds the integrated group of optical lenses as seen in plan view, and has a rectangular window of a rectangle similar to an outer shape of the integrated group of optical lenses.

* * * * *